Figure 1:
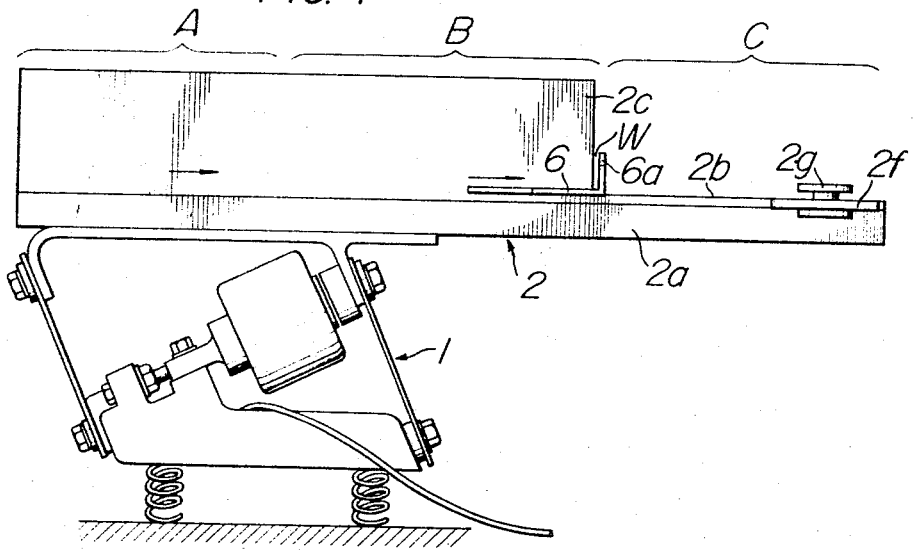

May 9, 1967

HIDEO TATIBANA 3,318,470

APPARATUS FOR HANDLING AMPULES

Filed Feb. 28, 1966

5 Sheets-Sheet 1

INVENTOR
Hideo Tatibana

BY *Karl W. Flocks*

ATTORNEY

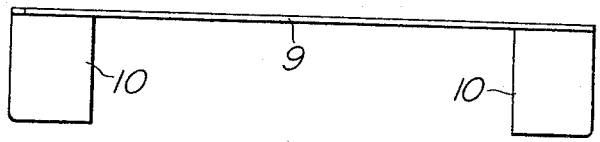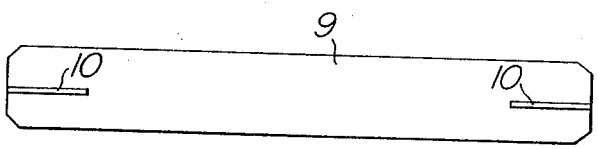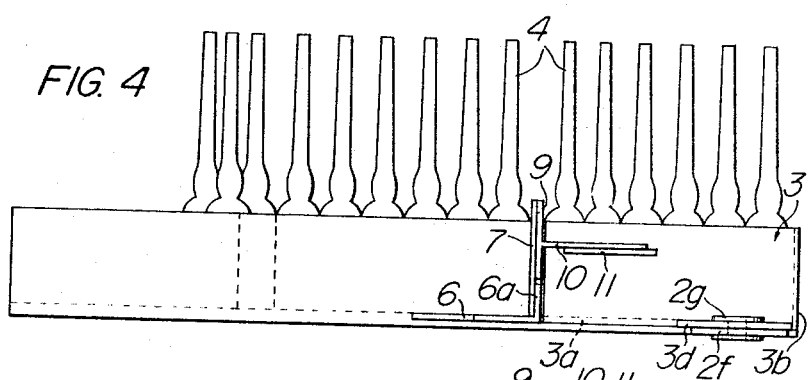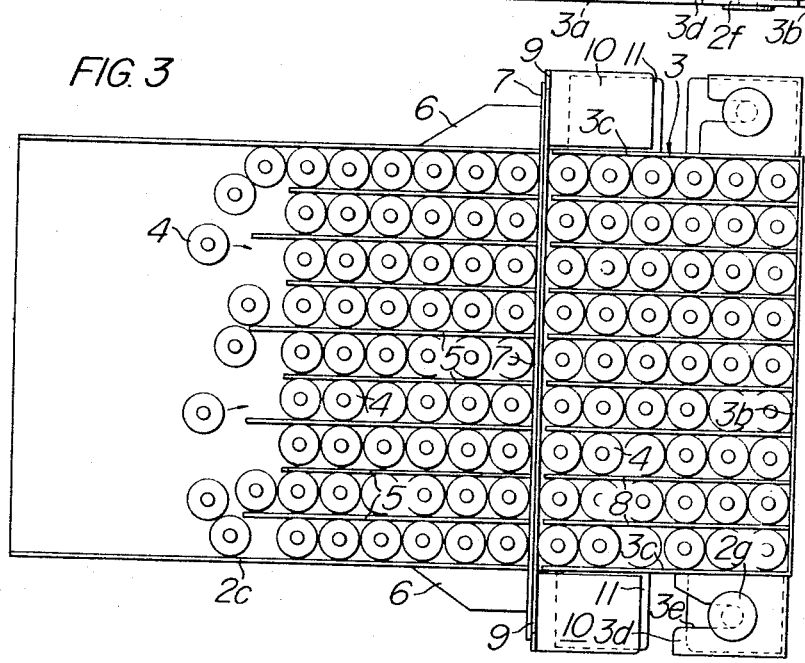

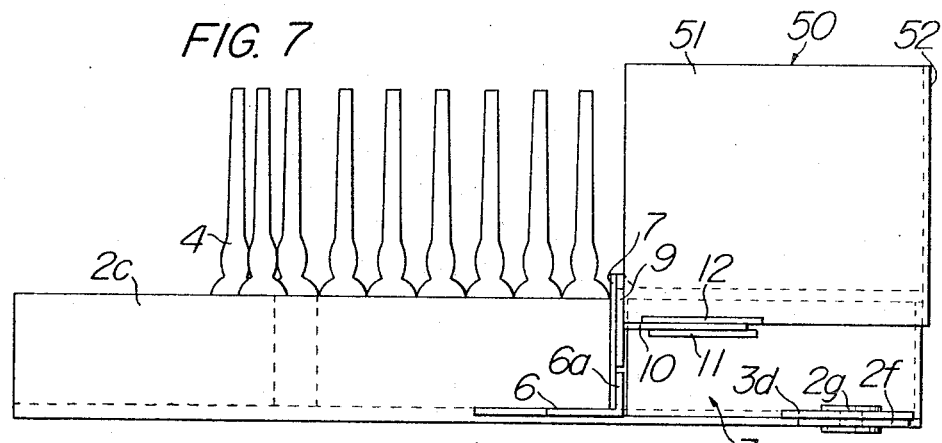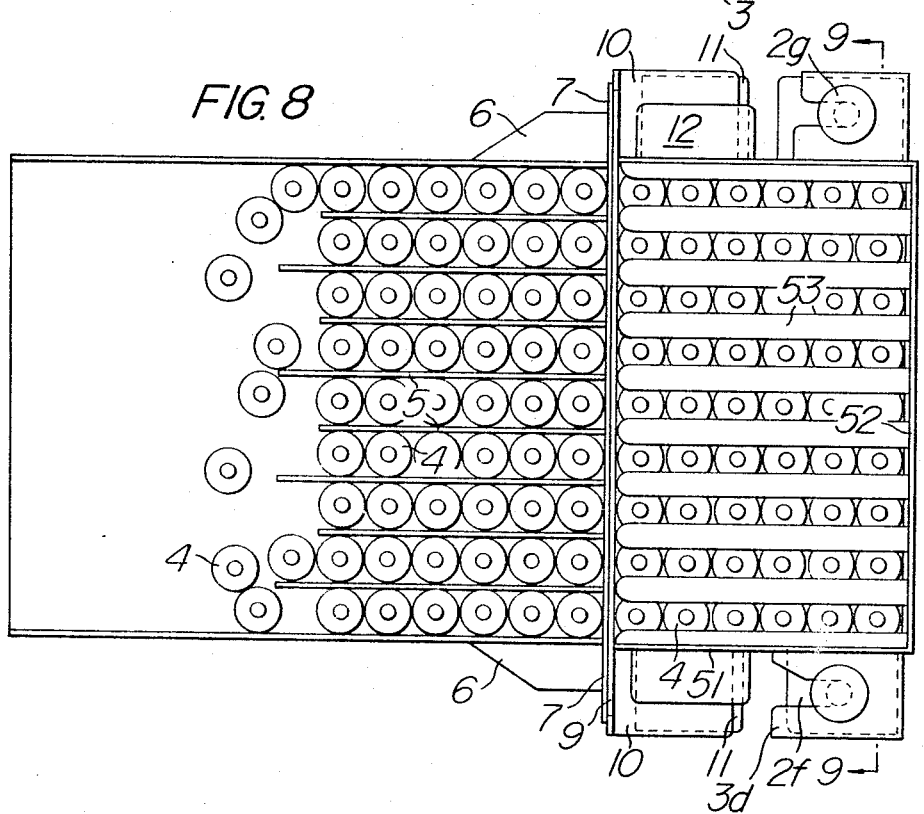

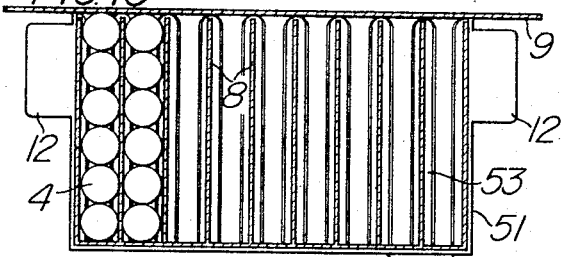
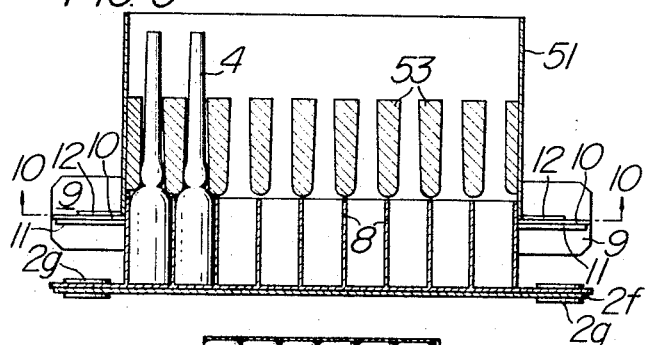
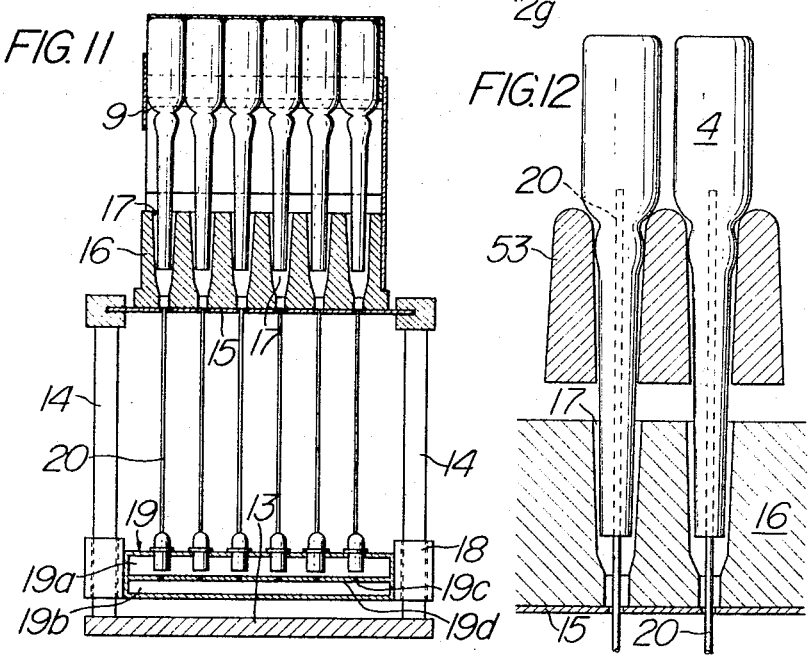
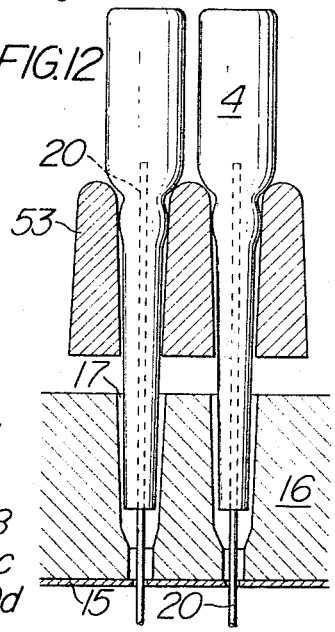

May 9, 1967  HIDEO TATIBANA  3,318,470
APPARATUS FOR HANDLING AMPULES
Filed Feb. 28, 1966                     5 Sheets-Sheet 5
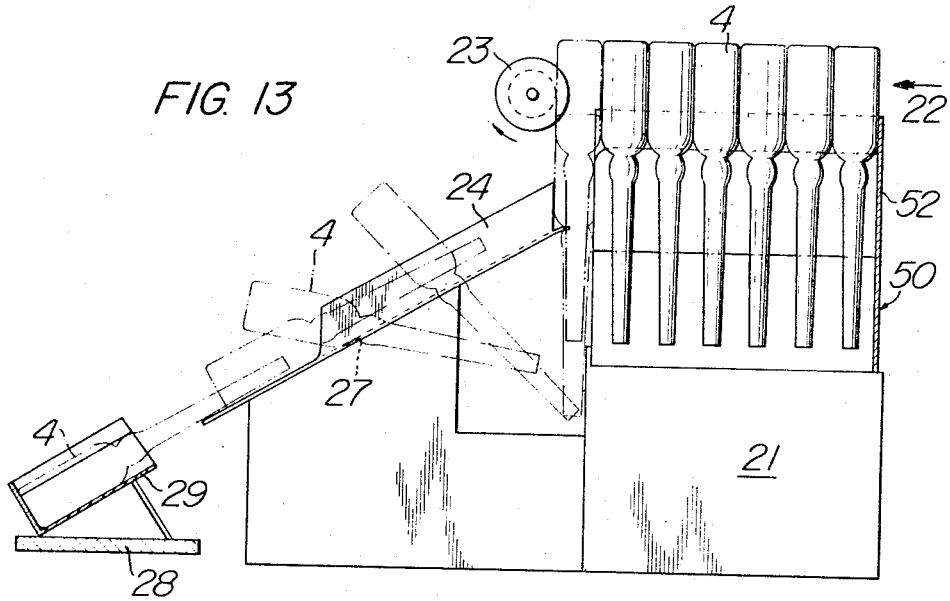
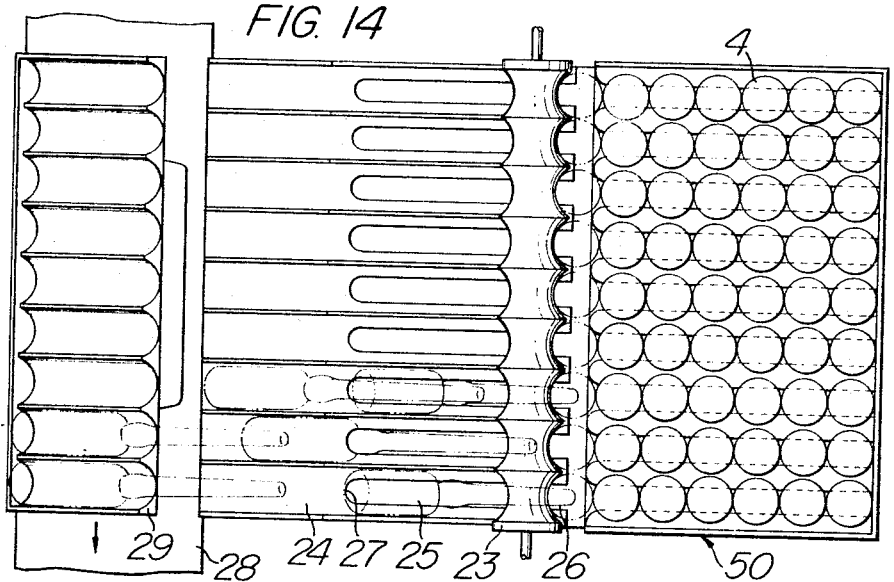
INVENTOR
Hideo Tatibana
BY Karl W. Flocks
ATTORNEY United States Patent Office 3,318,470
Patented May 9, 1967

3,318,470
APPARATUS FOR HANDLING AMPULES
Hideo Tatibana, 2–33 Showadori, Nakano-ku,
Tokyo, Japan
Filed Feb. 28, 1966, Ser. No. 530,553
5 Claims. (Cl. 214—301)

The present invention relates generally to an apparatus for handling a number of ampules, and particularly to an apparatus adapted to arrange, wash, dry, and sterilize said ampules, and lastly to transfer the ampules onto a moving conveyor system.

The present invention has for its object to provide a new and improved apparatus for automatically loading a casing with a certain number of ampules, washing and, if necessary, drying and/or sterilizing said ampules in their inverted state, and transferring the above treated ampules onto a conveyor system in a single line on which the ampules are to be filled with a liquid medicine and then sealed.

According to the present invention, there is provided an apparatus for handling ampules comprising in combination feeding means, receiving means, retaining means and transferring means, said feeding means comprising a substantially horizontal table consisting of ampule-supplying and arranging areas and provided with an electromagnetic vibrator fixed thereto and with parallel partition walls on the upper face of the ampule-arranging area to define parallel paths for the ampules, whereby the ampules supplied to and set upright on the ampule-supplying area at random travels into the ampule-arranging area as arranged into rows within the paths and are fed to the receiving means, said receiving means comprising a floor, parallel partition walls on the floor corresponding to the partition walls of the feeding means and an end wall provided on the floor traverse to the partition walls, and adapted, when the receiving means is set so that the floor is in continuation and at the same level with the table of the feeding means with the partition walls thereon in horizontal alignment with the partition walls of the feeding means, to receive ampules from the feeding means between the partition walls on the floor until stopped by the end wall, said retaining means comprising ampule supporting parallel banks rigidly connected each other with the center-to-center distances therebetween same with the distances between the partition walls of the receiving means and registering means for registering the retaining means with respect to the receiving means so that the ampule supporting banks are placed above the partition walls of the receiving means in vertically aligned relation, whereby the shoulders of the ampules received in the receiving means are held on the ampule supporting banks when the ampule receiving means together with the retaining means are turned upside-down and the receiving means is removed from engagement with the ampules, said transferring means comprising a sloping bed for receiving ampules from the retaining means at the upper portion of the bed as the ampules are pushed out from the retaining means along the ampule supporting banks line by line of the ampules to slide on the bed down onto a conveyor.

Figure 2:
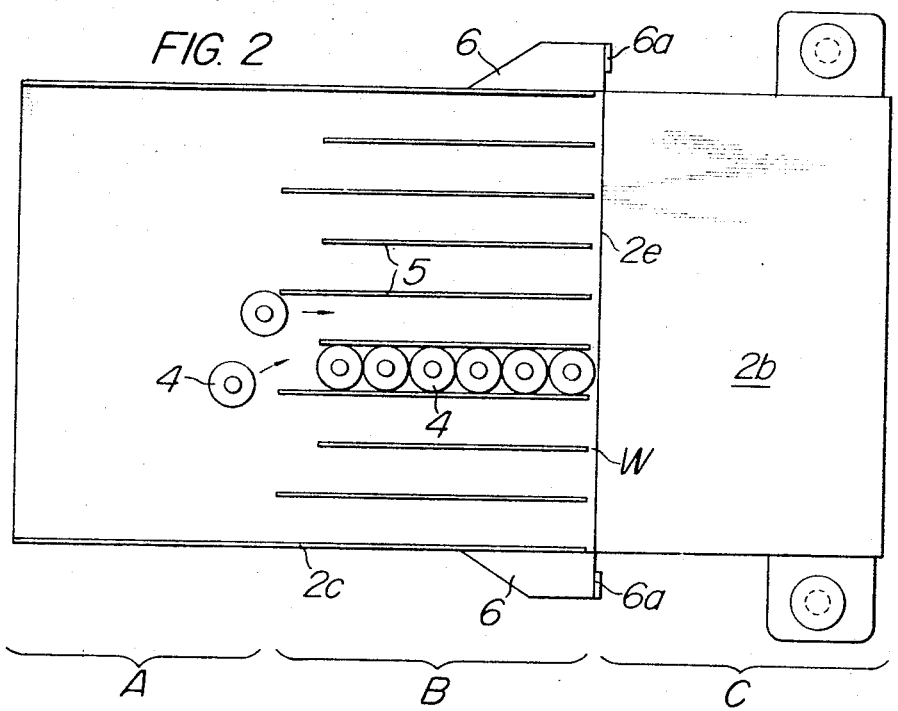

The present invention will be made more apparent from the following description taken in reference to the accompanying drawings which show a preferred embodiment thereof and in which:

FIG. 1 is a side view of an arranging device of the present ampule handling apparatus, FIG. 2 is a plan view of said arranging device on which several ampules are set upright, FIG. 3 is a plan view of said arranging device provided with a vibration table having a receiving case mounted thereon, said case being closed by a partition plate after it was loaded with a certain number of ampules, FIG. 4 is a side view of the device shown in FIG. 3, FIGS. 5 and 6 are a plan and a side view, respectively, of the partition plate for retaining the ampules in the receiving case, FIGS. 7 and 8 are a side and a plan view similar to the devices shown in FIGS. 4 and 3, respectively, a retaining case being mounted on the receiving case loaded with the ampules, FIG. 9 is a vertical cross section taken along line 9—9 of FIG. 8, but only a few ampules are illustrated, FIG. 10 is a horizontal cross section taken along line 10—10 of FIG. 9, FIG. 11 is a vertical cross section of a washing device on which the ampules are supported in an inverted state, showing one aspect of a washing operation, FIG. 12 is an enlarged cross section of a portion of FIG. 11 taken from a direction perpendicular thereto, showing the other aspect of the washing operation, and FIGS. 13 and 14 are a side view and a plan view, respectively, of a transferring device, illustrating transferring operation of the ampules to a conveyor system.

The same reference numerals will be used to refer to the same parts throughout the following description of the drawing.

FIGS. 1 and 2 show a side view and a plan view, respectively, of an arranging device constituting a part of the present ampule handling apparatus. The arranging device comprises generally an electromagnetic feeder 1 and a vibration table 2 securely mounted thereon. The electromagnetic feeder 1 may be of ordinary type, the supporting base of said feeder being fixed to a rigid floor through suitable spring means. The vibration table 2 may be settled firmly on said electromagnetic feeder 1 through substantially horizontal base beams 2a, on which a platform 2b may be also settled firmly. The platform 2b consists of three sections, i.e., supplying section A, arranging section B and receiving section C. A common upper surface of said supplying section A and arranging section B is slightly higher than that of said receiving section C, and, to say more precisely, the former surface is requested to have an even one flush with the upper surface of a base plate 3a of a receiving case 3 when it is mounted on the ampule receiving section C. Supplying section A and arranging section B may be provided with opposite common side walls 2c extending throughout substantially entire length thereof in a parallel relationship to the direction of vibration of said electromagnetic feeder 1 or vibration table 2. Outer horizontal lugs 6 have the same upper surfaces flush with that of the section B may be formed on the side walls 2c at the right-hand ends thereof with reference to FIG. 2. Each of the lugs 6 is provided with an upright piece 6a at the right-hand end thereof so that a clearance W for receiving a partition plate 7 (see, for instance, FIGS. 3 and 4) may be left between the edge of said side wall 2c and said piece 6a. The arranging section B is also provided with a plurality of partition walls 5 on the upper surface of said section extending throughout substantially entire length thereof in a parallel relationship to said side walls 2c so that partition walls 5 and side walls 2c may have equal distances each other slightly larger than outer diameter of a body part of the ampules. It will be clearly understood from FIG. 2, 3 or 8 that the right-hand ends of said side walls 2c and the partition walls 5 are substantially aligned in a line which is separated from the right-hand edges 2e of the arranging section B by a small clearance W, and the partition walls 5 have alternately different lengths within a desired range.

Two lugs 2f are mounted horizontally and outwardly on the opposite sides of the platform 2b near the right-hand end thereof. A clip 2g for locating tightly said receiving case 3 on the platform 2b is mounted on the upper surface of each of said lugs 2f.

In FIG. 2, a few ampules 4 are shown on the platform 2b of a vibration table 2, and in FIG. 3, the arranging section B is loaded with a certain number of ampules 4. In operation, a number of ampules 4 may be successively set upright at random places on the supplying section A, and moved generally to the direction of an arrow by means of vibration of said electromagnetic feeder 1, and then can smoothly enter into channels defined by partition walls 5 and side walls 2c, the selection of a channel into which a certain ampule may enter being readily made at the zigzag ends of the partition walls 5. Thus, the ampules 4 can move smoothly from the supplying section A toward the receiving section C through the arranging section B.

FIG. 3 or 4 illustrates an appearance that the receiving case 3 is loaded with ampules which reached the receiving section C through the arranging section B as aforementioned. The receiving case 3 is shaped like a dust-pan as defined by a base plate 3a and three side walls, i.e. two longitudinal side walls 3c and a transverse side wall 3b, and the remaining side is open so as to receive ampules which will enter progressively into said case 3. It will be readily understood from FIGS. 3 and 4 that when the receiving case 3 is mounted on the receiving section C of said vibration table 2, said longitudinal side walls 3c are adapted to be aligned to the side walls 2c of the vibration table 2 with small intervals therebetween, and a plurality of partition walls 8 provided within said case 3 are also adapted to be aligned to said partition walls 5, respectively, provided on said platform 2b with small intervals therebetween. The locating of said receiving case 3 on said receiving section C of the platform 2b is attained by the engagement of the clips 2g, which are mounted on the horizontal lugs 2f provided on the opposite sides of the platform 2b near the right-hand end thereof, with recesses 3e formed in horizontal lugs 3d provided on the opposite sides of the receiving case 3 near the right-hand end thereof. On the opposite side walls 3c of the receiving case 3 are also mounted two lugs, respectively, horizontally and outwardly for the purpose as will be explained later.

It will be readily understood from FIGS. 3 and 4 that after the receiving case 3 is loaded with ampules, the partition plate 7 may be inserted between the right-hand ends of the side walls 2c and partition walls 5 and the above-mentioned upright piece 6a to separate the arranging section B from the receiving section C, so that the ampule may be held in the arranging section B when the receiving case 3 is taken off from the receiving section C. Another partition plate 9 having two lugs 10 formed on the opposite ends thereof at right angles to the surface thereof, as shown in FIGS. 5 and 6, is inserted between aforesaid partition plate 7 and the receiving case 3 as shown in FIG. 3 or 4. Thereupon, said lugs 10 are adapted to abut on aforesaid lugs 11 of the receiving case 3. As shown in FIGS. 7 and 8, an ampule retaining case 50 is applied on the receiving case 3 to surround the ampules therein. As will be clearly understood from FIGS. 9 and 10, said retaining case 50 includes two longitudinal side walls 51 and a transverse end wall 52. The lower edge of said side wall 51 may have a horizontal lug 12 formed thereon outwardly at a right angle thereto so that the lug 12 may abut on aforesaid lug 10 of the partition plate 9. Accordingly, when the stacked lugs 11, 10 and 12 are moved as a unit to the right in FIG. 7 or 8, the receiving case 3, the retaining case 50 and the partition plate 9 can be removed in a body together with the ampules loaded therein from the vibration table 2. A plurality of ampule supporting banks 53 extending throughout substantially entire length of said side walls 51 in a parallel relationship thereto are mounted at equal intervals on a transverse end wall 52 of the retaining case 50. The supporting banks 53 are so formed that the ridges of said banks may keep in contact with shoulder parts of the ampules when the retaining case 50 is applied on the receiving case 3, whereby the ampules may be held by said banks within the retaining case 50 when it is inverted together with said receiving case 3. The supporting banks are formed so that the pitch thereof is slightly larger than the outer diameter of a body part of the ampule, and the space between side walls of said banks is slightly larger in the vicinity of the ends of the banks which will keep in contact with the shoulder parts of ampules, than the outer diameter of a neck part of the ampules.

FIG. 11 shows a device for washing the inner and outer faces of ampules. The ampule washing device may comprise four struts 14 vertically extending from the corners of a horizontal rectangular base 13, a perforated plate 15 having a plurality of small holes which is mounted on the upper portions of struts, a perforated frame 16 fixedly mounted on said plate 15 having a plurality of vertical bores 17 preferably tapering to the base end the inner diameter of which is slightly larger than the outer diameter of the neck part of the ampule, a detergent injection tank 19 fixed to four sleeves 18 each of which may be mounted slidably upward and downward on the strut, and a plurality of injection pipes 20 vertically extending from said tank from which the detergent is injected passing through said perforated plate 15 and vertical bores 17. The combination comprising the receiving case 3 loaded with ampules, the partition plate 9 and the retaining case 50 as mounted on said receiving case 3, after it was removed from the vibration table 2 by the stacked lugs 11, 10 and 12 as explained with reference to FIGS. 7 and 8, is set in its inverted state on said frame 16. It is preferable under these circumstances that the side walls 51 and the end wall 52 of said retaining case 50 may be engaged tightly with the outer periphery of said frame 16, and moreover each of the inverted ampules, the vertical bores 17 formed in said frame 16, and the vertical injection pipes 20 may be aligned correspondingly. This arrangement is clearly illustrated in FIG. 11. With reference to FIG. 11, the detergent injection tank 19 is divided to a detergent chamber 19a and a high pressure gas supplying chamber 19b by a diaphragm 19d having a number of small holes 19c positioned correspondingly just under the injection pipes 20, and the high pressure gas introduced into said supplying chamber 19b is ejected from said small holes 19c, so that the detergent as introduced into said chamber 19a is abruptly ejected into said bores 17 through the injection pipes 20 to wash the inner and outer faces of the ampules. On this occasion, when the sleeves 18 are moved upwardly, the injection pipes 20 are also moved upwardly to enter into the body parts of ampules 4 passing through the neck parts thereof. Therefore, it will be easily understood that the inner and outer faces of ampules can be fully washed by the detergent. Thus, after the washing operation of ampules has been completed, hot-air drying or sterilizing operation, if necessary, can be practised to the ampules in their inverted state.

Following the above operations, the combination comprising the retaining case 50, the receiving case 3 and the partition plate 9 is carried away from the washing device to be mounted on a supporting base 21 of said ampule transferring device as shown in FIG. 13, and then said receiving case 3 and said partition plate 9 are removed in order that the ampules may be pushed out one after another from the retaining case 50 in the direction of a double arrow 22. On this occasion, of course, it is necessary that the side walls 51 and end wall 52 of the ampule retaining case 50 extend to cover the portions of the ampule body parts to the extent that the peripheral ampules should be held in the case 50 without falling down therefrom. When the ampules in a line are pressed in the direction of the arrow 22, they move along the supporting banks 53 until they are going to fall away from the retaining case 50. As soon as the ampule gets clear of the supporting banks, the body part of said ampule abuts against a roll means 23 which rotates about a horizontal axis as prepared at a right angle with the longitudinal direction of said banks or the advancing direction of said ampules as shown in FIG. 13 or 14. Said roll means 23 may be in the form of an assemblage comprising a plurality of bobbin-like rolls put end to end thereof, each of the curved faces having a substantially same curvature with that of the ampule body part. As the roll means rotates about its axis in the clockwise direction with reference to FIG. 13, the ampules which have been advancing toward the roll means will change their courses downward. Then, the shoulder parts of the descending ampules will engage with the uppermost ends 26 of elongated slots 25 formed longitudinally therefrom in inclined sliding beds 24. Each of the slots 25 has a width somewhat larger than the outer diameter of the neck part of the ampule, and a length longer than that of the neck part of the ampule. Therefore, the ampule will slide down along the slot 25 with the body part thereof up until the ampule raises its neck part at the lowest end 27 of the slot. Assuming that the center of gravity of the ampule lies within the body part thereof, the ampule will be about to incline during said sliding. Thus, as soon as the ampule gets clear of the slot, the axis of the ampule will become substantially parallel to the sliding bed 24, on which the ampule will slide down with the body part thereof in the lead until it will take its seat on a receiving box 29, which may be preferably located in a surface parallel to the sliding bed. Thus, as soon as the ampules in each line take their seats on the receiving box 29, a conveyor 28 will carry away the box mounted thereon and bring the next empty box to its fixed place to receive the next group of ampules. After all, the receiving boxes filled with the treated ampules will be sent repeatedly to the place where the ampules are to be filled with a liquid medicine and then sealed.

While the present invention has been described in connection with a particular embodiment, it is to be understood that it is easily capable to obtain various modifications and improvements. Changes, therefore, in the construction and arrangement may be made without departing from the spirit and scope of the invention as disclosed in the appended claims.

What is claimed is:

1. An apparatus for handling ampules comprising in combination feeding means, receiving means, retaining means and transferring means, said feeding means comprising a substantially horizontal table consisting of ampule-supplying and arranging areas and provided with an electro-magnetic vibrator fixed thereto and with parallel partition walls on the upper face of the ampule-arranging area to define parallel paths for the ampules, whereby the ampules supplied to and set upright on the ampule-supplying area at random travel into the ampule-arranging area as arranged into rows within the paths and are fed to the receiving means, said receiving means comprising a floor, parallel partition walls on the floor corresponding to the partition walls of the feeding means and an end wall provided on the floor traverse to the partition walls, and adapted, when the receiving means is set so that the floor is in continuation and at the same level with the table of the feeding means with the partition walls thereon in horizontal alignment with the partition walls of the feeding means, to receive ampules from the feeding means between the partition walls on the floor until stopped by the end wall, said retaining means comprising ampule supporting parallel banks rigidly connected each other with the center-to-center distances therebetween same with the distances between the partition walls of the receiving means and registering means for registering the retaining means with respect to the receiving means so that the ampule supporting banks are placed above the partition walls of the receiving means in vertically aligned relation, whereby the shoulders of the ampules received in the receiving means are held on the ampule supporting banks when the ampule receiving means together with the retaining means are turned upside-down and the receiving means is removed from engagement with the ampules, said transferring means comprising a sloping bed for receiving ampules from the retaining means at the upper portion of the bed as the ampules are pushed out from the retaining means along the ampule supporting banks line by line of the ampules to slide on the bed down onto a conveyor.

2. The apparatus according to claim 1, in which the breadth of the paths between the partition walls of the feeding means is slightly larger than the diameter of the ampules to be handled and the partition walls of the feeding means terminate at their up-stream ends zigzag and at their down-stream ends in line near the end of the table.

3. The apparatus according to claim 2, in which the registering means for the retaining means comprises tabs fitted to the retaining means at both sides thereof and co-operating means, the both sets of tabs engageable each other to fix relative position of the retaining means with respect to the receiving means.

4. The apparatus according to claim 3, in which the ampule supporting banks are connected each other through an end wall to which the banks are fitted at their ends.

5. The apparatus according to claim 1, the transferring means further comprising a rotary roller means located above the up-stream end of the bed traverse to the slope of the bed to abut line by line of the ampules pushed out from the retaining means and thrust down the ampules onto the bed with the big bottom portion directing upward, and slots are formed in the up-stream end portion of the bed parallel to the slope, the slots opening at their up-stream ends, whereby the ampules pushed out from the retaining means falls on the bed and held at their shoulders on the bed with the narrow top portions of the ampules penetrating through the slots and then are turned at the down-stream end of the slots to slide down the bed with the bigger bottom portions of the ampules directing parallelly downward relative to the slope of the bed.

No references cited.

HUGO O. SCHULZ, *Primary Examiner.*